US009288870B2

(12) United States Patent
Kiryuschev et al.

(10) Patent No.: US 9,288,870 B2
(45) Date of Patent: Mar. 15, 2016

(54) DISPLAY MODULE AND TILED DISPLAY MANUFACTURING METHOD

(71) Applicants: Irina Kiryuschev, Oranit (IL); Semyon Konstein, Yaroslavi (RU)

(72) Inventors: Irina Kiryuschev, Oranit (IL); Semyon Konstein, Yaroslavi (RU)

( * ) Notice: Subject to any disclaimer, the term of this patent is extended or adjusted under 35 U.S.C. 154(b) by 149 days.

(21) Appl. No.: 14/022,284

(22) Filed: Sep. 10, 2013

(65) Prior Publication Data

US 2014/0062289 A1    Mar. 6, 2014

Related U.S. Application Data

(63) Continuation of application No. 12/084,939, filed as application No. PCT/IL2006/001308 on Nov. 14, 2006, now Pat. No. 8,531,642.

(60) Provisional application No. 60/736,006, filed on Nov. 14, 2005.

(51) Int. Cl.
     *H05B 33/26*     (2006.01)
     *G06F 3/14*      (2006.01)
     *G06F 3/147*     (2006.01)
     *G02F 1/1333*    (2006.01)

(52) U.S. Cl.
     CPC .............. *H05B 33/26* (2013.01); *G06F 3/147* (2013.01); *G06F 3/1446* (2013.01); *G02F 1/13336* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 4,640,592 A | 2/1987 | Nishimura et al. | |
| 5,422,747 A * | 6/1995 | Wakita | 349/143 |
| 5,644,327 A * | 7/1997 | Onyskevych et al. | 345/80 |
| 5,673,091 A | 9/1997 | Boisdron et al. | |
| 5,796,452 A | 8/1998 | Pierson | |
| 5,903,328 A | 5/1999 | Greene et al. | |
| 6,097,455 A | 8/2000 | Babuka et al. | |
| 6,177,912 B1 | 1/2001 | Izumi | |
| 6,262,696 B1 | 7/2001 | Seraphim et al. | |
| 6,490,402 B1 * | 12/2002 | Ota | 385/147 |
| 6,567,138 B1 | 5/2003 | Krusius et al. | |
| 6,642,542 B1 | 11/2003 | Shimoda et al. | |
| 6,803,978 B2 | 10/2004 | Bayrle et al. | |

(Continued)

FOREIGN PATENT DOCUMENTS

| | | |
|---|---|---|
| EP | 0611178 | 8/1994 |
| JP | S54093388 | 7/1979 |

(Continued)

OTHER PUBLICATIONS

International preliminary report on patentability for PCT/IL2006/001308, dated Mar. 10, 2009.*

*Primary Examiner* — Mike Stahl

(74) *Attorney, Agent, or Firm* — Daniel J. Swirsky; AlphaPatent Associates Ltd.

(57) ABSTRACT

A flat panel display device including at least one display module in the form of a matrix of pixels formed by active media enclosed between two sets of conductors, where the display module has a front side by which it is to be exposed to viewers and an opposite back side where an electronic control circuit is located, and includes two sets of electrical conductors extending along two intersecting axes respectively to define a two-dimensional array of junctions forming said pixels, each of the conductors of at least one set of conductors being bent to extend from the front side to the opposite back side of the display module.

23 Claims, 18 Drawing Sheets

(56) References Cited

U.S. PATENT DOCUMENTS

| | | | |
|---|---|---|---|
| 6,870,519 B2 | 3/2005 | Sundahl | |
| 6,876,423 B2 | 4/2005 | Bayrle et al. | |
| 6,967,114 B2 | 11/2005 | Shimoda et al. | |
| 7,362,046 B2 | 4/2008 | Aston | |
| 2002/0187697 A1* | 12/2002 | Kiryuschev et al. | 442/181 |
| 2003/0090198 A1 | 5/2003 | Aston | |
| 2003/0090200 A1* | 5/2003 | Topelberg et al. | 313/511 |
| 2004/0009729 A1* | 1/2004 | Hill et al. | 442/208 |
| 2004/0245915 A1* | 12/2004 | Miki | 313/495 |
| 2005/0078104 A1* | 4/2005 | Matthies et al. | 345/204 |
| 2005/0218797 A1 | 10/2005 | Bechtel et al. | |
| 2005/0231680 A1* | 10/2005 | Hioki et al. | 349/156 |
| 2007/0197115 A1* | 8/2007 | Eves et al. | 442/194 |

FOREIGN PATENT DOCUMENTS

| | | |
|---|---|---|
| JP | S58132273 | 8/1983 |
| JP | H01034794 | 3/1989 |
| JP | H07006875 | 1/1995 |
| JP | 2004178854 | 6/2004 |
| WO | WO9948124 | 9/1999 |
| WO | WO02067227 | 8/2002 |

* cited by examiner

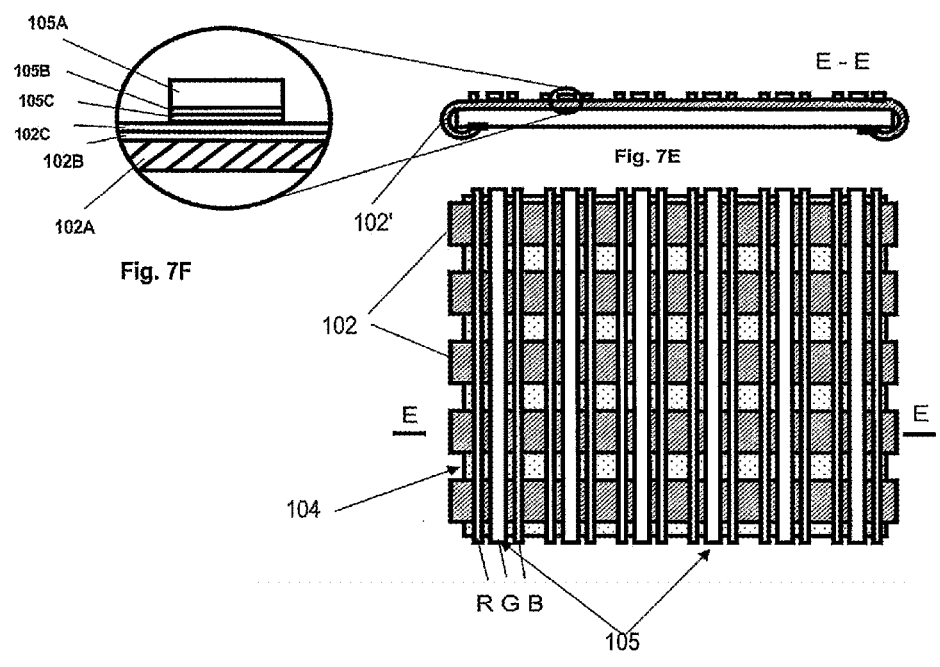

DISPLAY MODULE AND TILED DISPLAY MANUFACTURING METHOD

CROSS-REFERENCE TO RELATED APPLICATIONS

This application is a continuation of U.S. patent application Ser. No. 12/084,939, which is a U.S. National Phase Application under 35 U.S.C. 371 of PCT International Application No. PCT/IL2006/001308, which has an international filing date of Nov. 14, 2006, and which claims the benefit of priority from U.S. Provisional Patent Application No. 60/736,006, filed on Nov. 14, 2005.

FIELD OF THE INVENTION

The present invention is generally in the field of flat panel displays and relates to tiled flat displays of arbitrary size and high resolution.

BACKGROUND OF THE INVENTION

Existing flat displays are of different types including those utilizing the so-called "passive matrix" formed by an active medium (e.g. electro-light-modulating, such as liquid crystal, or electro-luminescent structure) enclosed between two sets of electrodes, and "active matrix" configuration formed by an active medium adjacent to electrodes and transistor-based arrangements. Known flat panel displays may be configured either with large size, or configured to provide high resolution of a displayed image. However, a display having both large size and high resolution is difficult to obtain.

FIG. 1 graphically shows (in logarithmic coordinates) a relation between the resolution and display size for modern displays of different types, namely plasma display, LCD display, LCD TV display, CRT display, and LED billboards display. Here, resolution is measured in pixels/inch, and display size is measured in inches as square root of the display area. Each dot represents these two parameters, the resolution and size, for the respective display. It is seen that none of these displays has both large size and high resolution.

The known Liquid Crystal, Electroluminescent and Plasma Displays on solid or film substrates cannot practically be made very large and provide sufficiently high resolution at the same time. One reason for this is that long narrow transparent conductive tracks on an ITO base (typically used in such displays) have excessively high electrical resistance ($R=\rho l/h$, where $\rho$ is the specific resistance of the used conductive film (ITO), $l$ is the length of the track and $h$ is its width). Billboards (BB) based on discrete Light Emitted Diodes (LEDs) can be made of an arbitrary large size but do not allow high resolution. The highest achievable resolution for displays of this type is 2 pixels/inch.

Tiled displays are comprised of multiple display modules. Each of these display modules may be configured as LCD, Electroluminescent, Plasma or other type display based on solid or flexible film substrate. Generally, the modular approach provides for as large as desired size of the entire display structure. However, since transparent conducting tracks (electrodes) on upper and lower substrates of the display matrix have to be connected to the control circuits of the display, each part of the tiled display has an inactive zone on at least two adjacent sides. This is schematically illustrated in FIGS. 2A and 2B showing contacting zones near two adjacent sides of a passive matrix display. FIG. 2B is a cross section of FIG. 2A taken along line A-A. As shown, the display device includes a front (transparent) substrate 1, a spaced-apart parallel rear substrate 2, flexible cables 3 connecting conductive tracks 5 forming the display matrix, and a controller circuit 4. A contact pad 6 of the conductive track 5 is connected to a contact pad 7 of the flexible cable 2 by conductive glue 8 (e.g. Z-conductor).

Thus, any tiled display, and especially that consisting of more than four parts (modules), will practically provide a defective image. There will always be a grid superimposed on the main image, with the step size and the line width defined by the constituent display size and inactive zone width, respectively. FIG. 3 exemplifies a typical grid defect of a tiled display. As a result, tiled displays can be of no more than twice the size of normal displays without producing defective images.

SUMMARY OF THE INVENTION

There is a need in the art for a large-size high-resolution flat panel display device, that is easy to fabricate and is cost effective.

The present invention solves the above problem by providing a novel flat panel display structure that can be used as a basic block (module) in a multi-module display structure. This is achieved by moving a contacting zone (a zone where the conductive tracks of a matrix display module are brought into contact with the conductive tracks of cables supplying power and control signals from controller circuits) from the front side of a display module to its back side.

According to one broad aspect of the invention, there is provided a flat panel display device comprising at least one display module in the form of a matrix of pixels formed by active media enclosed between two sets of conductors, the display module having a front side by which it is to be exposed to viewers and an opposite back side where an electronic control circuit is located, and comprising two sets of electrical conductors extending along two intersecting axes respectively to define a two-dimensional array of junctions forming said pixels on the front side of the display device, each of the conductors of at least one set of conductors being bent to extend from the front side to the opposite back side of the display module.

In some embodiments of the invention, the display device includes a substrate defining the front and back side of the display module and carrying the conductors of the display module. The substrate may for example be common for at least some of the display modules, and/or the display module substrates are attached to one another.

The substrate may be a solid body. One of the two sets of conductors may be configured as a pattern of conductive tracks on the dielectric substrate.

Alternatively, the substrate may be flexible, for example in the form of a woven structure formed by dielectric threads. The conductors of both sets of conductors may be previously stretched elastic threads. The conductors of both sets of conductors and the dielectric threads may interlace together to form a woven structure like a fabric. In some other embodiments, the dielectric threads are interlaced to form a woven fabric and the conductors of both sets of conductors are located on said fabric in an interlacing or non-interlacing fashion.

Each conductor is in electrical contact with a contact pad at the back side of the respective display module.

The conductors of the display module may be bent around a side surface of the substrate in case the substrate is used. Alternatively, when the conductors are woven into fabric and no substrate is used, the conductors are at one end thereof bent to pass along the back side of the display module.

The active media is applied to regions of the junctions, thereby forming light emitting or light modulating pixels. This can be implemented by locating the active media on the conductors of at least one set of conductors. In some other embodiments, the active media is partially located on the conductors of at least one of the two sets of conductors, and/or in the vicinities of the junctions. Also, the configuration may be such that the active media is located on the conductors of one set, and an additional layer of a substantially transparent electrically conductive material is located over the active media in the vicinity of the junctions to thereby ensure an electrical contact between the active media and the conductors within the junctions. In yet other embodiments, this can be achieved by locating a layer of the active media between the conductors of the two sets. The active media may be of at least three different types capable of emitting or modulating light of at least three different wavelengths, respectively.

The display device may include an array of the display modules attached to one another to form a multi-module display device. The conductors of the display modules may be located on the common substrate, or the substrates of the display modules may be attached to one another. In the multi-module device, such parameters as a distance between the conductors, a thickness of the conductors, a distance between the extremely located conductor of each set and a close and parallel thereto edge of the front side of the display module, and a distance between said display modules, are selected to provide equally distanced pixels along each of said two axes within the entire multi-module display device.

The conductors of all pairs of the sets of conductors of the display modules may be interwoven with additional dielectric threads into a common for all modules fabric. Alternatively, the adjacent display modules may be bonded or sewed with dielectric thread, or may be connected with previously stretched elastic threads or bands.

In some embodiments of the invention, the front sides of the display modules are glued by transparent glue to a transparent substrate. The transparent substrate may be solid or flexible, or may have a combination of solid and flexible regions. A grid (preferably black grid) may be inserted between the display modules and the transparent substrate. The grid pitches are substantially equal to the pixel pitches along the corresponding axes.

Each of the display modules includes its own controller circuit. The display modules may be divided into groups. In this case, controlling of information input to the controller circuits of the display modules of the same group is effected via a matrix technique, and control of each group is effected by a separate controller unit.

The active media includes at least one electroluminescent or electro-light-modulating material. The electroluminescent material(s) may include at least one of the following: inorganic phosphors, layers of semiconductor materials forming inorganic LEDs, small molecular or polymer organic luminophore, polymer LED structure. In some embodiments the active media may include at least one of the following materials: electrophoretics, gyricons, electrochromic materials, liquid crystals, e-inks.

According to another broad aspect of the invention, there is provided a flat panel display device comprising a one- or two-dimensional array of display modules attached to one another, each of the display modules being in the form of a matrix of pixels formed by active media enclosed between two sets of conductors, the display module having a front side by which it is to be exposed to viewers and an opposite back side where an electronic control circuit is located, and comprising two sets of electrical conductors extending along two intersecting axes respectively to define a two-dimensional array of junctions forming said pixels on the front side of the display device, each of the conductors of at least one set of conductors being bent to extend from the front side to the opposite back side of the display module.

According to yet another aspect of the invention, there is provided a method for use in fabricating a display module for a multi-module flat panel display device in the form of a matrix of pixels formed by active media enclosed between two sets of conductors, the method comprising bending each of the conductors of at least one set of conductors in at least one end thereof and extending the bent conductor from a front side of the display module by which it is to be exposed to viewers to an opposite back side of the display module to be connected to an electronic control circuit, thereby enabling as large as desired number of the display modules in the display device with substantially high pixel density within the entire display device.

According to yet a further aspect of the invention, there is provided a method for manufacturing a multi-module flat panel display device in the form of a matrix of pixels formed by active media enclosed between two sets of conductors, to obtain as large as desired size and high pixel density of the display device, the method comprising bending each of the conductors of at least one set of conductors in at least one end thereof and extending the bent conductor from a front side of the respective display module by which it is to be exposed to viewers to an opposite back side of said display module to be connected on said back side to an electronic control circuit.

BRIEF DESCRIPTION OF THE DRAWINGS

In order to understand the invention and to see how it may be carried out in practice, preferred embodiments will now be described, by way of non-limiting examples only, with reference to the accompanying drawings, in which:

FIGS. 7D to 7F exemplify the configuration of the display module in which conductors of both sets are strips arranged to form an array of OLEDs;

DETAILED DESCRIPTION OF THE INVENTION

Figure 1:
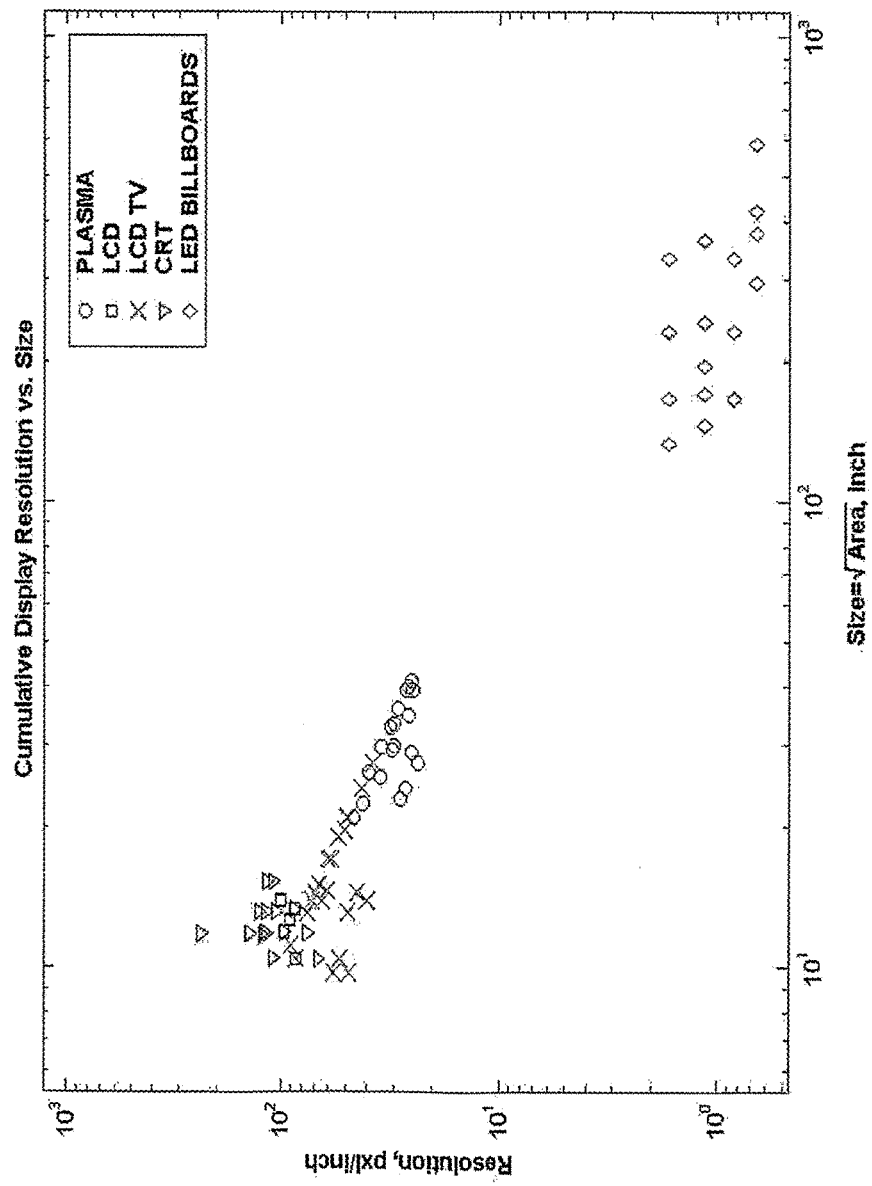
FIG. 1 graphically shows a relation between the resolution and the display size for modem displays of the following types: plasma display, LCD display, LCD TV display, CRT display, and LED Billboard display.
Figure 2A:
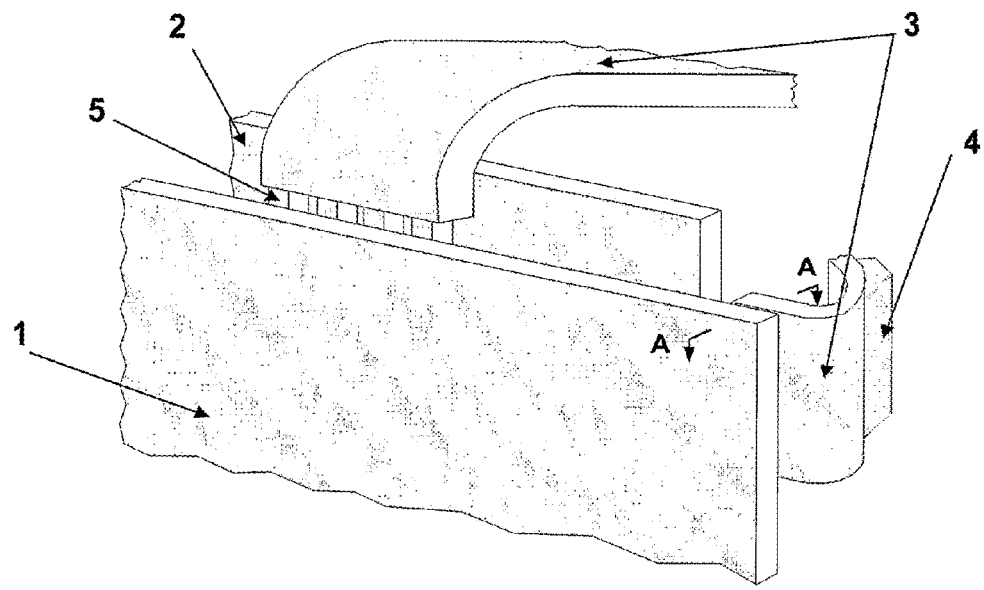
FIGS. 2A and 2B illustrate schematically a typical matrix display configuration showing contacting zones near two adjacent sides of the matrix display.
Figure 2B:
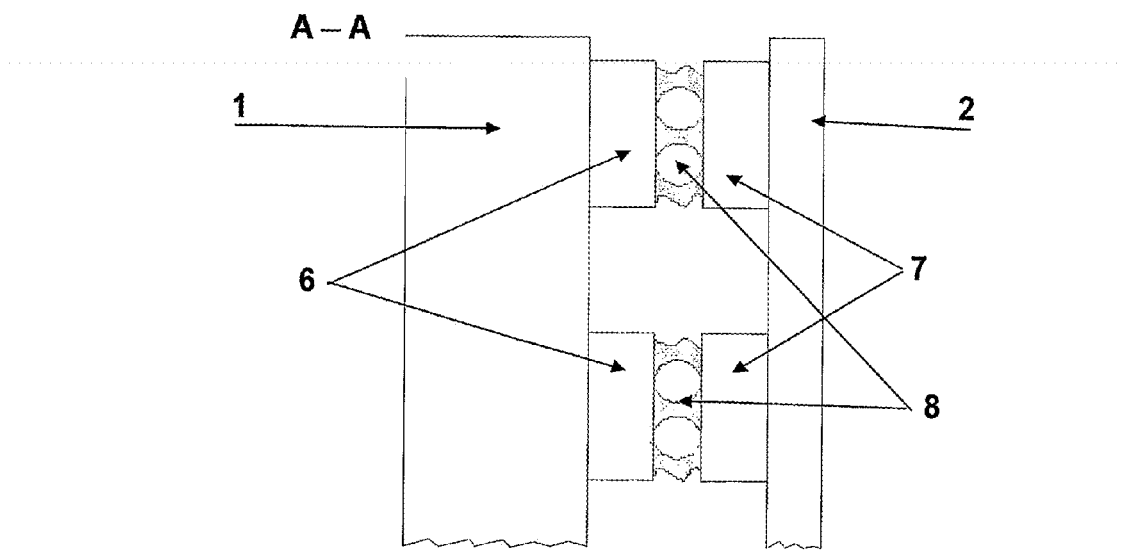
Figure 3:
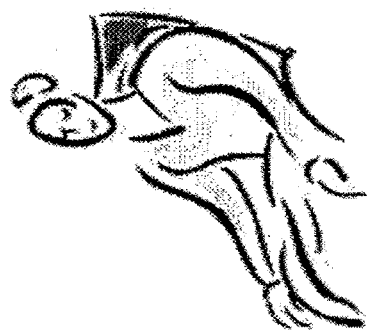
FIG. 3 exemplifies an image on a tiled display, demonstrating a typical grid defect of conventional displays.
Figure 3:
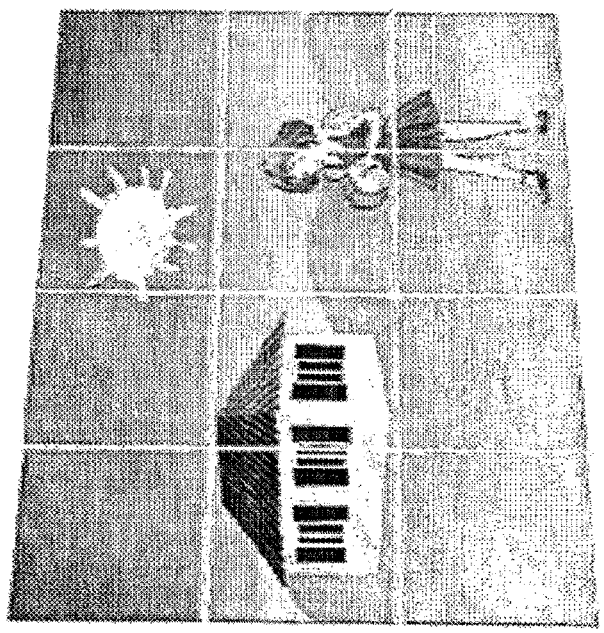
Figure 4A:
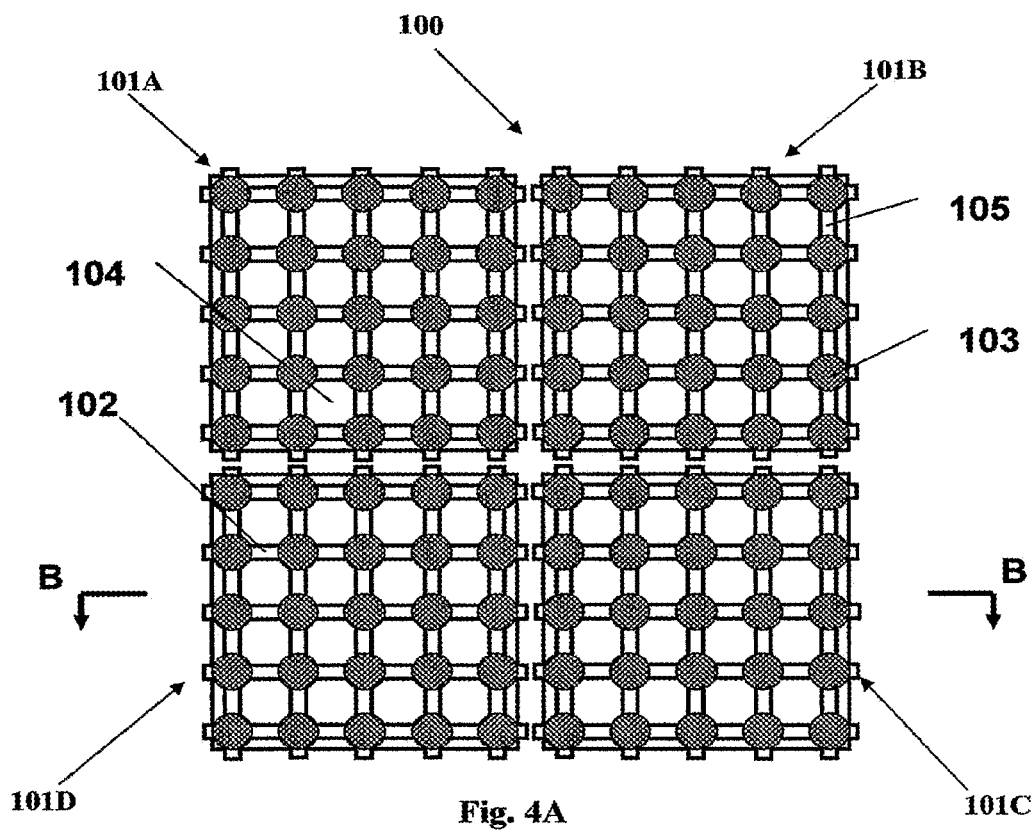
FIGS. 4A and 4B illustrate schematically a tiled display device according to an example of the present invention.
Figure 4B:
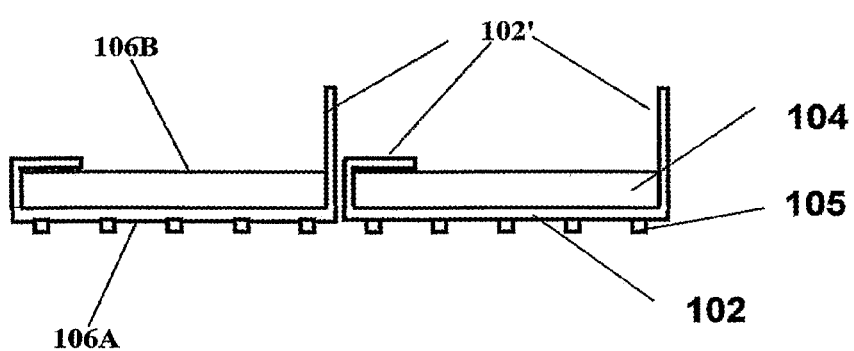

Reference is made to FIGS. 4A and 4B schematically illustrating a tiled display device 100 according to an example of the present invention. As shown in FIG. 4A, the display device is formed by multiple tiles (subdisplays)—four such subdisplays 101A-101D in the present example. Generally, the subdisplay of the present invention is configured as a passive matrix display including two sets of electrical conductors (termed X- and Y-sets) extending along two intersecting axes, respectively, and active media. The active media and the conductors are arranged to define together the subdisplay body. The X- and Y-sets of conductors define a two dimensional array of junctions. For example, such a subdisplay body may be carried on a substrate, solid or flexible.

In the present example, the device 100 includes a substrate 104 carrying conductors 105 from Y-set of conductors, conductors 102 from X-set of conductors, and electro-luminescent or electro-light-modulating media 103. Also, in the present example, the active medium 103 is deposited in the vicinity of the junctions. The active media material 103 applied at the areas of junctions form light emitting or light modulating pixels. In the present example, the arrangement of conductors is such that each junction presents the subdisplay pixel. As will be exemplified below with reference to FIGS. 7A-7C, the arrangement may be such that the pixel is defined by several junctions formed by overlap between several conductors of one set with one or more conductors of the other set.

It should be noted, although not specifically shown, that the subdisplay configuration may be such that the active media is a layer enclosed between the bottom set of conductors (e.g. X-set), located on top of the substrate, and the top set of conductors.

Such parameters as a thickness of the conductors, a distance between the pixels, a distance from the extremely located conductor of each set and the parallel thereto edge of the subdisplay body (e.g. substrate), and a distance between adjacent subdisplays are chosen such that the pixels are placed substantially uniformly over the entire tiled display, namely such that pixels of the entire tiled display are equally distanced from one another, forming a pattern (two-dimensional array) of pixels arranged equidistantly in each direction. As shown in FIG. 4B, which is a cross section of FIG. 4A taken along line B-B, each conductor extends from a front surface 106A of the substrate 104 (by which the display device is exposed to a viewer) to a back side 106B of the respective subdisplay body. In other words, each conductor has its at least one end portion (end portions 102' of the conductors 102 being seen in the figure) which is bent on the border of the subdisplay body (substrate 104 in the present example) to the back side thereof.

One of the two sets of conductors can be made as a pattern of conductive tracks on the dielectric substrate 104. Each conductor of the set is in electrical contact with a contact pad on the back side of the substrate, by a conductive pattern on the side facet of the substrate, or via appropriately provided openings through the substrate.

Figure 4C:
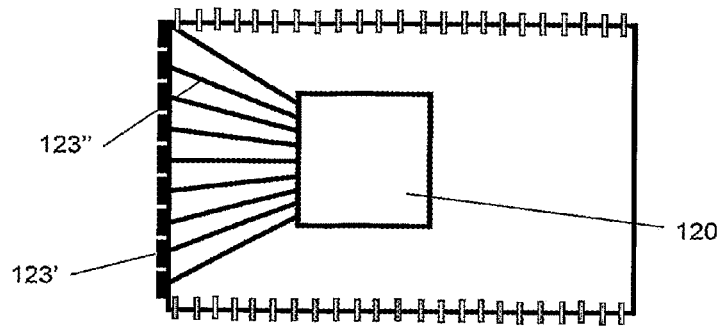
FIGS. 4C-4E illustrate an example of the display module device according to the invention utilizing connection of the conductors to a control circuit using a conductive pattern.
Figure 4D:
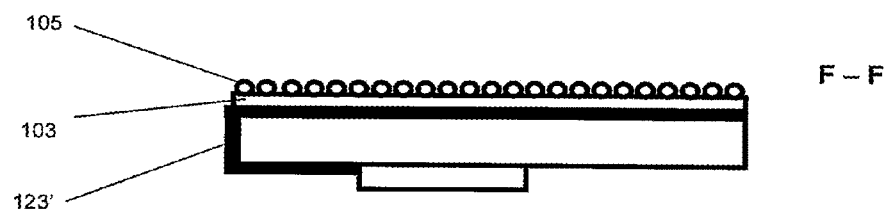
Figure 4E:
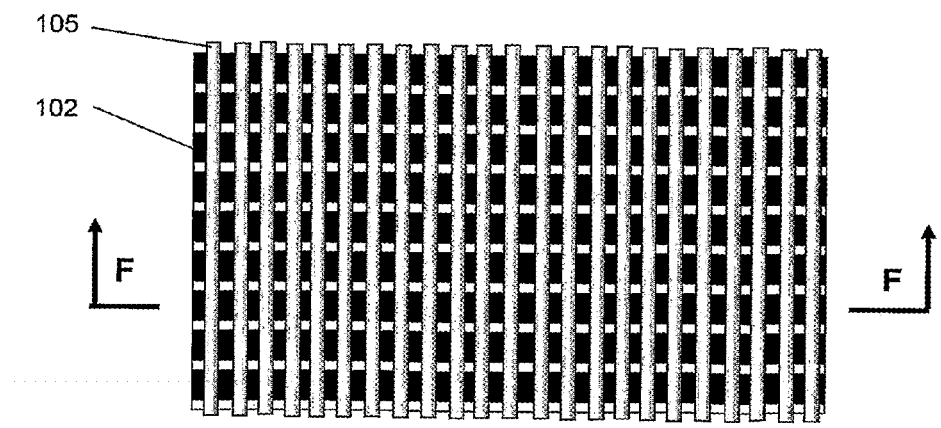

Reference is made to FIGS. 4C-4E exemplifying a display module in which active media 103 is a layer enclosed between first and second sets of conductors 105 and 105, located on a substrate 104. The conductors of the first set 105 are metal wires having bent portions (not shown) extending around the side of the solid substrate 104. The conductors of the second set are in the form of a pattern of conductive tracks 102 on the dielectric substrate 104. Each conductor of the second set 102 is in electrical contact with one conductive track from a conductive pattern 123' on the side facet of the substrate and successively with one conductive track from conductive pattern 123" on the back side of the substrate 104. The controller 120 is located on the back side of the substrate 104.

Figure 4F:
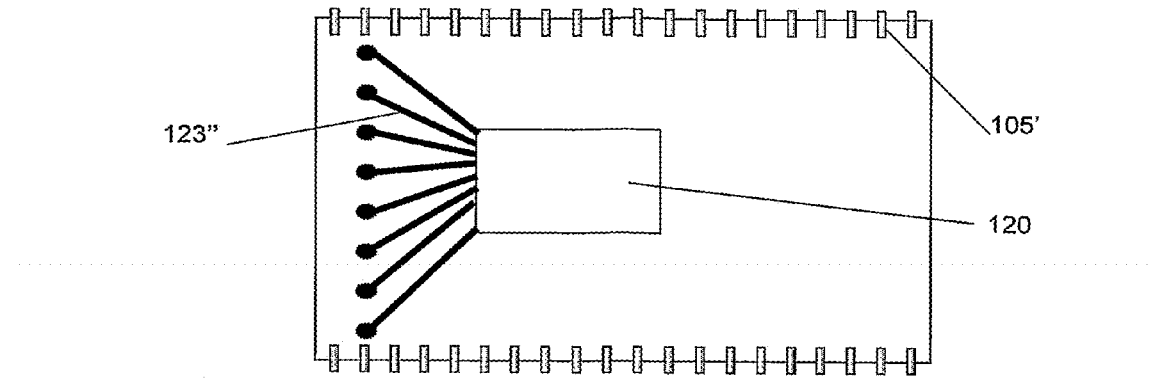
FIGS. 4F-4H show yet another example of the display module device utilizing connection of the conductors to a control circuit using a conductive pattern and through going openings in the substrate.
Figure 4G:
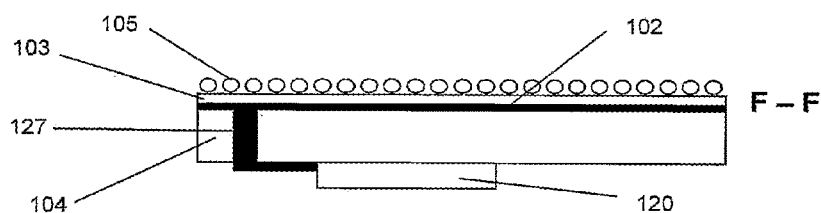
Figure 4H:
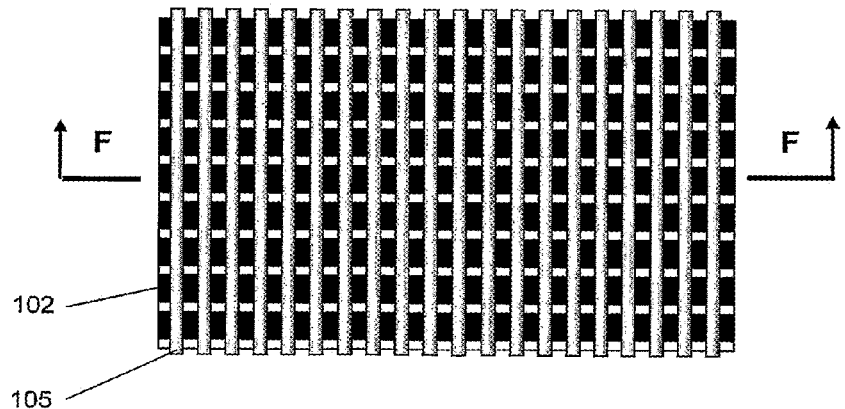

FIGS. 4F-4H exemplify a somewhat similar display module in which active media 103 is a layer enclosed between first and second sets of conductors 105 and 105, located on a substrate 104, where the first set conductors 105 are metal wires bent around the side of the solid dielectric substrate 104 and the second set is a pattern of conductive tracks 102 on the substrate 104. In this example, each conductor of the second set 102 is in electrical contact with conductive material filling entirely or partly an opening 127, which is in electrical contact with one conductive track from a conductive pattern 123" on the back side of the substrate 104. A controller 120 is located on the back side of the substrate 104.

As indicated above, the active media material(s) may include an electroluminescent or electro-light-modulating material. More specifically, the device is used with electroluminescent materials and is therefore described below with respect to this application. But it should be understood that the invention is not limited to this example.

It should also be noted, although not specifically shown, that the display modules may be provided with connectors for mechanical connecting the adjacent display modules to one another. These connectors, for example, may be in the form of textile fasteners, or may be adhesive tapes.

In some embodiments of the invention, the electroluminescent material is settled on the conductors of at least one set of conductors 102 and 105. For example, the conductors of one set are in the form of an electrically conductive core (e.g. of a substantially circular cross section) coated with an electroluminescent material, while the conductors of the other set are regular electrically conductive wires or strips. Also, an additional layer of transparent conductive material may be used being located over the electroluminescent material either along the conductor (that one in the form of a conducting core coated with the electroluminescent material) or in the vicinity of the junction(s) to ensure an electric contact or to change the electrical field configuration between the electrodes (conductors) and the electroluminescent material. The conductors of both sets of conductors 102 and 105 may be in the form of conductive filaments or flat yarns.

Figure 5A:
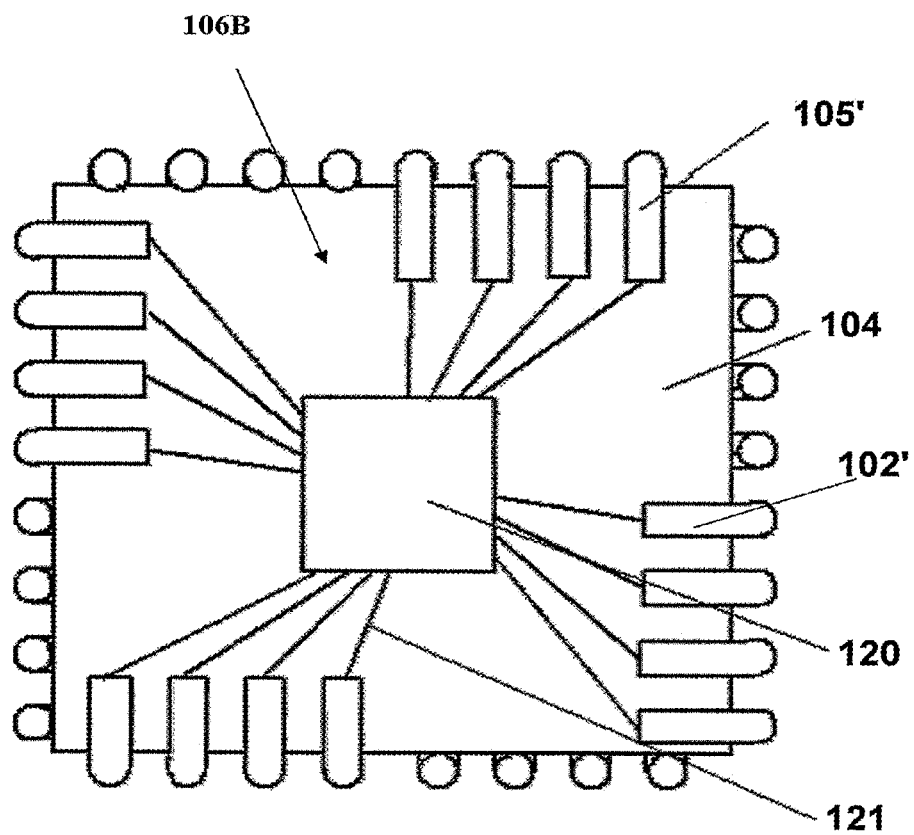
FIGS. 5A and 5B show two examples of the back side of a display module of the present invention.
Figure 5B:
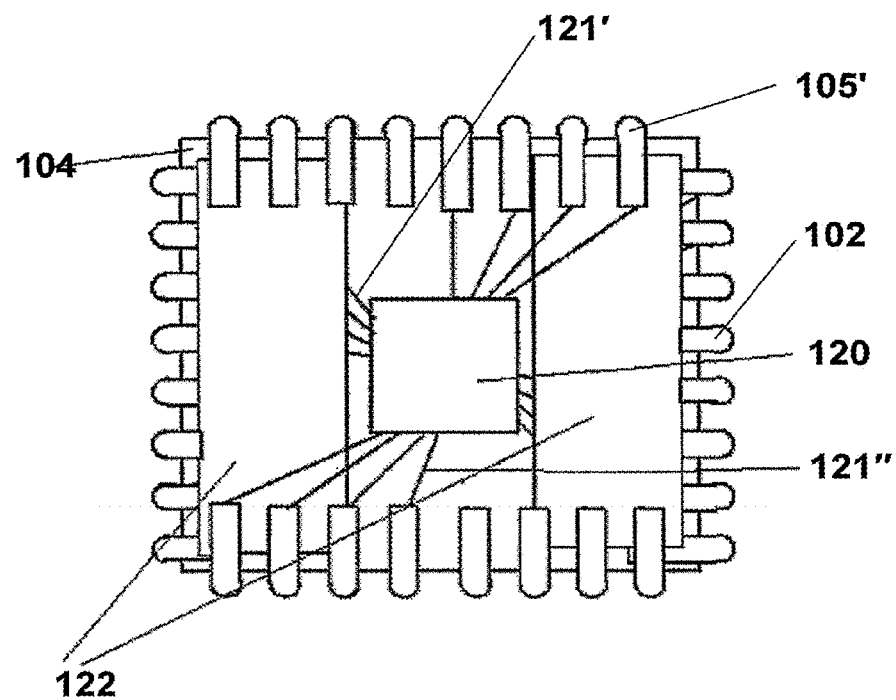

Reference is made to FIGS. 5A and 5B exemplifying the back side 106B of the display module. In the example of FIG. 5A, end portions 102' and 105' of both conductors' sets 102 and 105 are bent to the back side of the display module, and are connected there to a controller circuit 120 of the display module. In the present example, this connection is implemented via additional conductors 121 being separate wires, but it should be understood that conductors 121 may be constituted by a part of the conductive pattern or the end portions of the X- or Y-set conductors. In the example of FIG. 5B, a connection between the bent end portions of the conductors and the display module controller circuit 120 is implemented using additional dielectric spacers 122 between conductors 121' associated with the end portions 102' and conductors 121" associated with the end portions 105'. Here, the conductors 121' present a pattern of separate conductors, while the conductors 121" are either wires or the end portions of the Y-set conductors.

Figure 6:
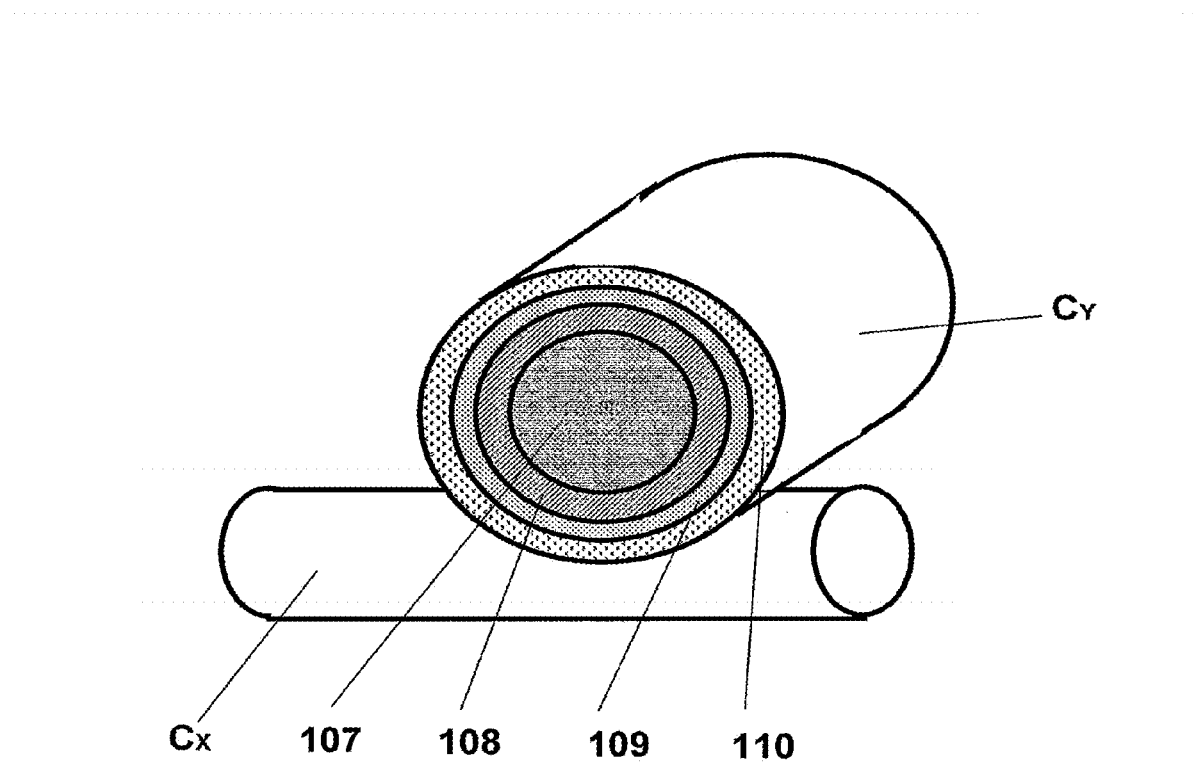
FIG. 6 shows more specifically a junction formed at the overlapping region between the X- and Y-sets conductors in the display device of the present invention.

FIG. 6 exemplifies a junction formed at the overlapping region between the X- and Y-sets conductors $C_X$ and $C_Y$. The conductor (or conductive fiber) $C_Y$ includes a strong core 107, which can be metal (e.g. copper, nickel) or dielectric (e.g. polyether, polyamide), an electrically conductive layer 108 functioning as a cathode (e.g. copper, nickel, silver, gold which may be covered or doped with e.g. Ca, Ba, Mg), an active medium material layer 109, and a transparent conductive layer 110 serving as an anode. For example, all these layers may form a light emitting diode (LED), and thus when appropriate voltage is applied to the conductor $C_X$ and the conductive layer 108, the active medium layer 109 emits light in all directions around the conductive fiber $C_Y$. The latter may have any suitable cross-section geometry, particularly it may be rectangular (strip-like conductor) or circular (wire-like conductor). In another example, the layers structure of such conductor $C_Y$ may be as follows: core 107 is made of metal (e.g. copper, nickel) of about 20 μm diameter, coated with a thin electrically insulating layer 108 of about 1 μm thickness, on which a thin film (less than 1 μm thickness) of active medium material 109 (e.g. ZnS appropriately doped to provide a desired color of luminescence) is placed, and a transparent conductive layer 110 thereabove.

Figure 7A:
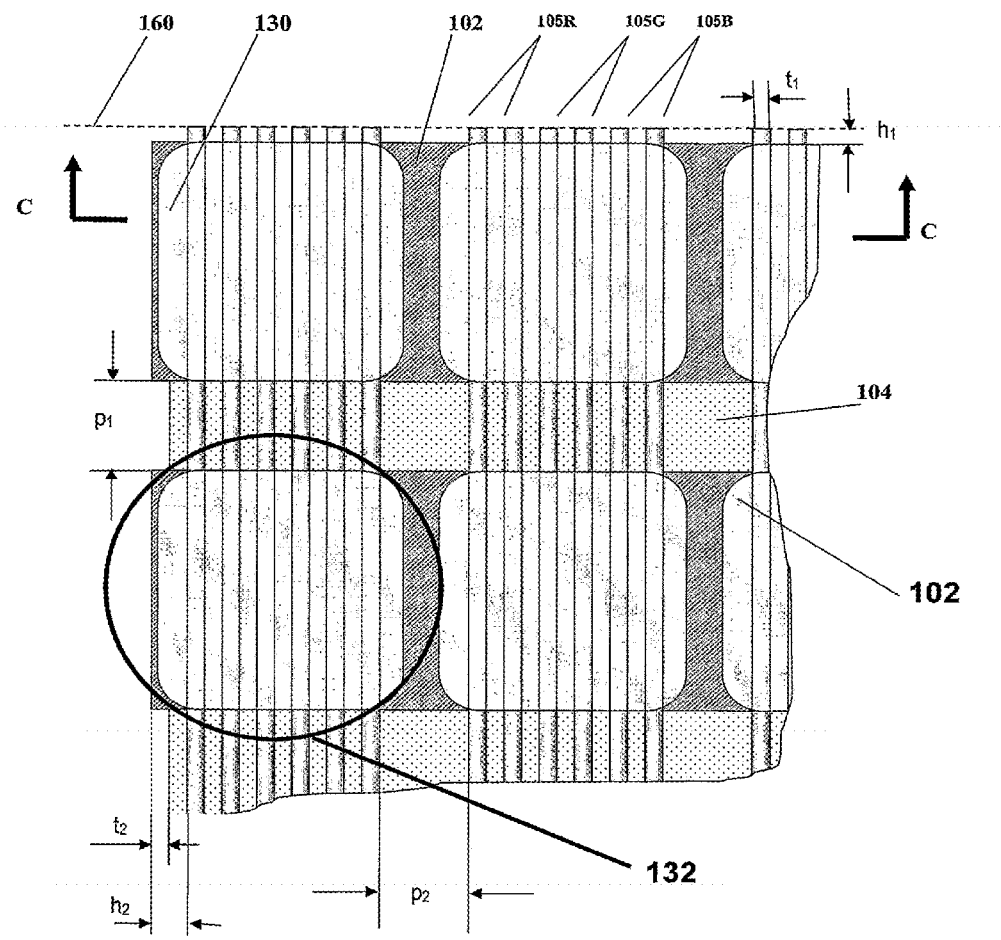
FIGS. 7A to 7C exemplify the configuration of a color display module of the present invention.
Figure 7B:
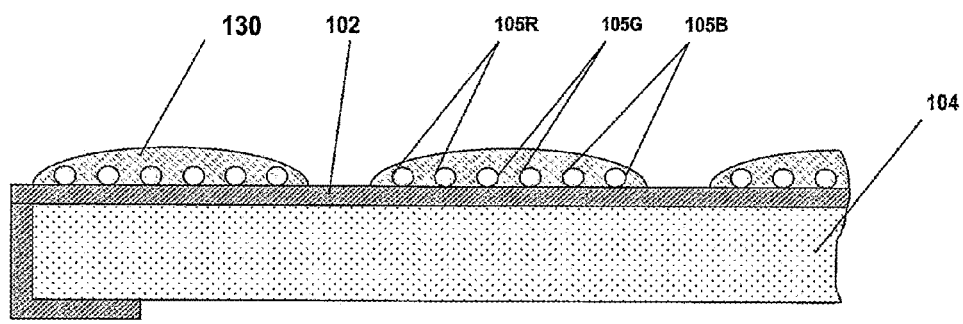
Figure 7C:
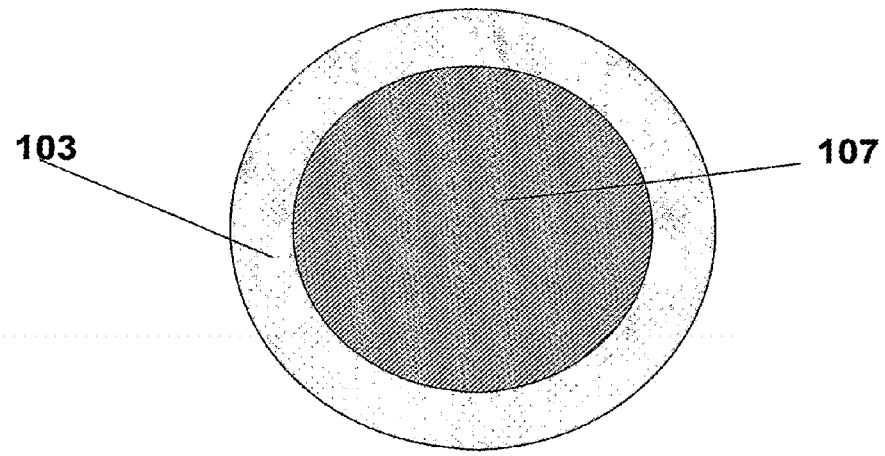

Reference is made to FIGS. 7A to 7C showing another example of the configuration of a display module of the present invention. FIG. 7A shows a front view of the display module. FIG. 7B shows a section view being a section of FIG. 7A taken along line C-C, and FIG. 7C shows a section of the Y-set conductor 105, used in this display module. The X-set conductor 102 is in the form of a strip.

As shown in FIG. 7C, each conductive fiber of the Y-set 105 includes a conductive core (e.g. copper, nickel or metallized plastic) 107 of about 10-20 μm diameter covered with an electroluminescent material layer 103 of less than 1 μm thickness. In the present example, as seen in FIG. 7A, the Y-set conductors are formed by three groups of two conductive fibers 105R, 105G and 105B formed by three types of electroluminescent materials, emitting light of different wavelengths in, respectively, red, green and blue spectral ranges. As shown in FIGS. 7A and 7B, a transparent conductor 130 (conductive polymer) is used above the conductors 105R, 105G and 105B to ensure the electric contact between the surface of the electroluminescent material layer 103 and the conductors' set 102, deposited on a dielectric substrate 104. A so-obtained color pixel 132 is shown in FIG. 7A. It should be understood that although in the present example of FIG. 7A each color subpixel is constituted by two adjacent conductors carrying the same color electroluminescent material, the number as well as size of conductors for different colors may be different.

For example, the conductors 105 may be configured as described above, namely include a metal core (e.g. copper, nickel) of about 20 μm diameter, coated with a thin electrically insulating layer of about 1 μm thickness, on which a thin film (less than 1 μm thickness) of active medium material (e.g. ZnS appropriately doped to provide a desired color of luminescence) is placed, and a transparent conductive layer thereabove. The electrically conducting strips 102 may have about 220 μm width, about 5-10 μm thickness, and may be arranged with a gap between them of about 80 μm. In this example, in order to obtain a display module for a tiled display with 300 μm/pixel it is sufficient to use a distance between the adjacent conductors 105 of about 20 μm, and a gap between the conductors 105 of different pixels of about 80 μm. Evidently, for such parameters, the display modules can be arranged in such a way that the distance between adjacent pixels in the entire display will be of 80 μm with a pitch 300 μm/pixel.

As indicated above, the display module (subdisplay) of the present invention, in either of its implementations as exemplified herein, is configured with predetermined values of such parameters as a thickness of the conductors in each set, a distance between the pixels, and a distance from the extremely located column or row of pixels and the parallel thereto edge of the subdisplay body.

Considering the example of FIG. 7A, thicknesses $t_1$ and $t_2$ of the conductors in each set, distances $p_1$ and $p_2$ between the pixels along the two directions, and distances $h_1$ and $h_2$ from the extremely located column or row of pixels and the parallel thereto edge of the substrate 104, are selected to ensure the equally distanced pixels of all the subdisplays along the respective axis. Preferably, the distance $h_1$ and $h_2$ from the extremely located column or row of pixels in the subdisplay and the parallel thereto edge of said subdisplay body satisfies the following conditions: $h_1 < p_1/2$, $h_2 < p_2/2$, $h_1 > t_1$, $h_2 > t_2$ (in the present example $h_1 = t_1$) thereby ensuring that $p_1$ and $p_2$ are the distances between the adjacent pixels for all the subdisplays along the respective axis. In the example shown in FIG. 7A, one of the edges 160 of subdisplay body is shown by dashed line.

In the above-described example of FIGS. 7A-7C, the conductors of one set 105 are wires, while the conductors of the other set are strips. The conductors 102 may be simple metal strips, while the conductors 105 may be metal-core wires coated with active media (e.g. with dielectric coating and further vacuum coating with thin film electroluminescent material e.g. inorganic phosphors). The wires 105 are located above the strips 102. This can be implemented by winding the wires 105 (e.g. simultaneously winding all the wires using an array of bobbins) around the substrate (subdisplay body) 104 on which the strips 102 are previously provided (e.g. printed), and then cutting off parts of the wires 105 on the back side of the substrate.

It should be understood that a subdisplay of the present invention can be manufactured with the strip-like conductors in both sets. In this connection, reference is made to FIGS. 7D-7F illustrating a display device including two sets of conducting strips 102 and 105 mounted on a dielectric substrate 104. FIG. 7E is a cross section of FIG. 7D taken along line E-E, showing that the conductors 102 of one set have bent end portions 102' extending from the front side of the display module to its back side. FIG. 7F shows more specifically the layer structure of the strips 102 and 105. In the present example, active medium 103 is in the form of a stack of various materials layers, some of these layers (one part of the stack) being deposited on the conductors 102 of one set and the other layers (the other part of the stack)—on the conductors 105 of the other set. When the conductors of two sets are arranged to form junctions, the two parts of the stacks face each other thus forming the complete stack of the active medium.

As an example, organic light emitting diodes can be used as the active media between the conductive strips 102 and 105. This can be implemented using the principles of organic light-emitting diodes (OLEDs) made up of multiple functional layers. This is disclosed for example in US patent publication No. 2005/0218797. The conductors of the first and second sets may for example be configured as follows:

The first set conductor 102 includes a "cathode" layer 102A (electrically conductive foil made of suitable metal (e.g., Ni, Cu, Ag or Au) and a layer 102B composed of an alkaline earth metal, such as cesium, calcium or barium. The provision of this layer is associated with obtaining a desired working function of the cathode. A layer 102C of light-emitting substance is located on top of the alkaline earth metal 102B. The light-emitting substance may, for example, contain a light-emitting organic polymer such as poly(p-phenylvinylene) (PPV) or a substituted PPV such as dialcoxy-substituted PPV. Polypyrrole, polythiophene, polyaniline and substituted and/or doped derivatives of these polymers may also be used as light-emitting substances, or other suitable light-emitting polymers such as poly[2-(6-cyano-6-methyl-heptyloxy)-1,4-phenylene (CN-PPP), poly[9,9-dihexyl fluorenyl-2,7-diyl], poly[9,9-di-(2-ethylhexyl)-fluoreny-1-2,7-diyl] or poly[9,9-dioctyl fluorenyl-2,7-diyl].

The second set conductor 105 includes a transparent polymer film 105A with embedded wires (metal regions) which are not specifically shown, coated with a transparent, electrically conductive layer 105B of ITO and further coated with a hole-conducting layer 105C containing for example, a conductive polymer, a conductive oligomer or an amine. The materials may possibly have substituents and/or dopings. A suitable material may comprise a tertiary amine, a tertiary aromatic amine, a polymer containing arylamine, an oligothiophene, a polythiophene, an oligopyrrole, a polypyrrole, an oligophenylene vinylene, a phenylene vinylene polymer, a vinylcarbazole oligomer, a vinylcarbazole polymer, a fluorine oligomer, a fluorine polymer, a phenylene acetylene oligomer, a phenylene acetylene polymer, an oligophenylene, a polyphenylene, an acetylene oligomer, a polyacetylene, a phthalocyanine or a porphyrin. Polyethylene dioxythiophene (PDOT), N,N'-bis(3-methylphenyl)-N,N'-bis(phenyl)benzidine (TPD), 4,4'-bis(carbazole-9-yl)biphenyl (CBP) or N,N'-di-[(1-naphthyl)-N,N'-diph-enyl]-(1,1'-biphenyl)-4,4'-diamine (α-NPD) are preferably used as hole-conducting materials. Either one of conductors 102 and 105, or both of them, may carry the electroluminescent material layer. In the present example, the electroluminescent layer is formed on the conductors 102 only.

The conductor strips of the first and second sets are located one above the other and clamped by heating (e.g. up to 80° C.) and then bent around the substrate. It should be noted that the conductors of any of the sets of conductors may be implemented in a common lowermost polymer film, which can be wound around the substrate.

Then, the conductors of the display module are connected to the control circuit. When all the display modules are attached to one another, the so-obtained display device body is packaged being sealed between two substrates (e.g. glass plates). The control circuits of all the display modules are connectable to a common controller e.g. forming matrix method of controlling.

In the above-described examples, the conductors of both sets of conductors 102 and 105 are mounted on the solid substrate. It should be noted that in those examples adjacent display modules may be connected with previously stretched elastic threads or bands. Spacers may be provided between the adjacent display modules. The dimensions of such spacers may be adjusted to ensure equal distance between the adjacent pixels of tiled display.

In some other embodiments, the conductors of both sets may be weaved to form a fabric, or the conductors of both sets together with dielectric threads may be weaved to form a fabric, or the conductors of both sets and previously stretched elastic threads may be weaved to form a fabric. More specifically, the subdisplay module of the present invention may be a woven structure, having a flexible woven body (substrate) carrying the two sets of conductors, or may be configured such that the interlacing conductors form the woven structure defining the subdisplay body. The conductors of both sets, while overlapping to define junctions, may or may not be interlaced. Adjacent display modules may be bonded or sewed sewn with a dielectric thread.

Figure 8A:
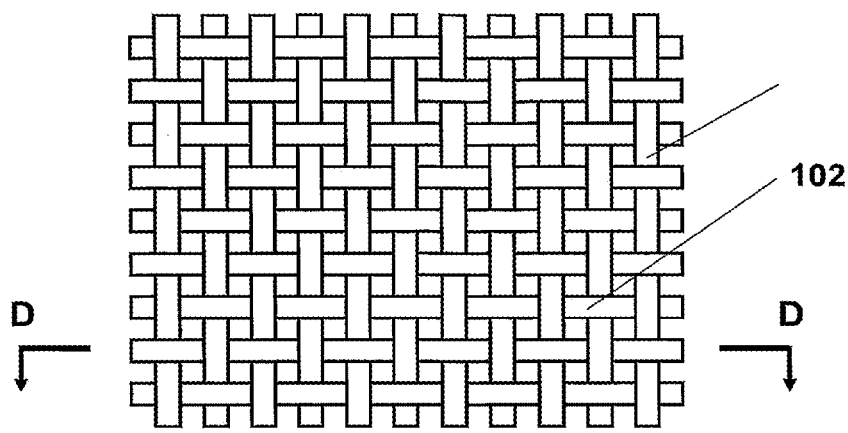
FIGS. 8A and 8B exemplify woven-type display structures of the present invention where the conductors of the two sets are interlaced (interconnected)
Figure 8B:
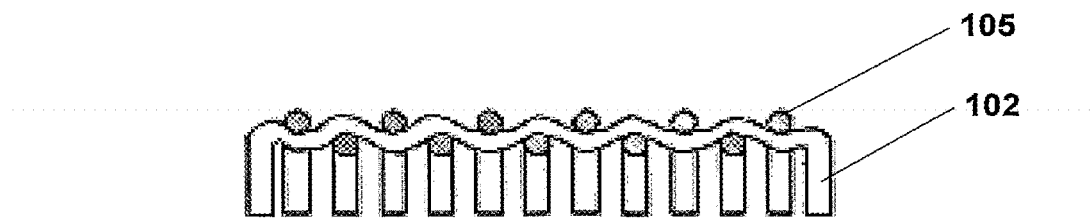

FIGS. 8A and 8B exemplify in a self-explanatory manner some woven structures formed by two sets of threads presenting the interlaced conductors of two sets 105 and 102.

FIG. 8B is a cross section of FIG. 8A taken along line D-D.

Figure 9:
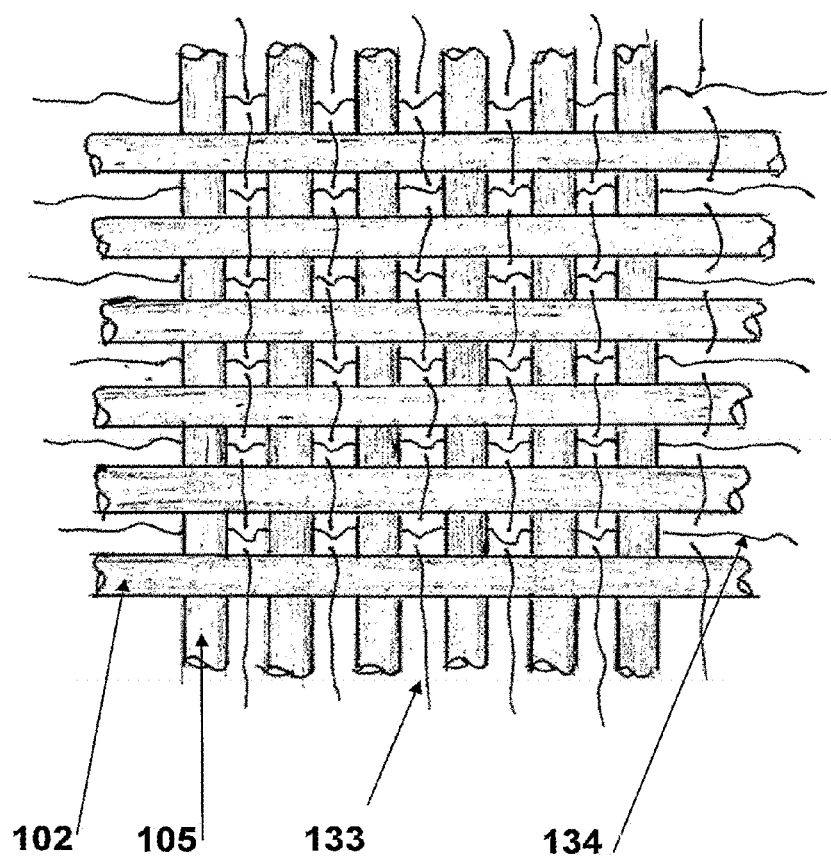
FIG. 9 shows another example of a woven structure of a display module of the present invention in which the conductors of two sets are not interconnected.

FIG. 9 shows a woven structure of a display module including conductors 105 and 102 and additional dielectric threads 133 and 134. Here, the Y-set conductors 105 and the X-set conductors 102 by themselves do not interlace, and the woven structure is formed by the dielectric threads and conductors all together. In other words, the interlacing dielectric threads and both sets of conductors form the woven structure serving as the subdisplay body (flexible substrate). Some of the dielectric threads can be formed by previously stretched elastic threads. This reduces the size of an unused space between the pixels.

Figure 10:
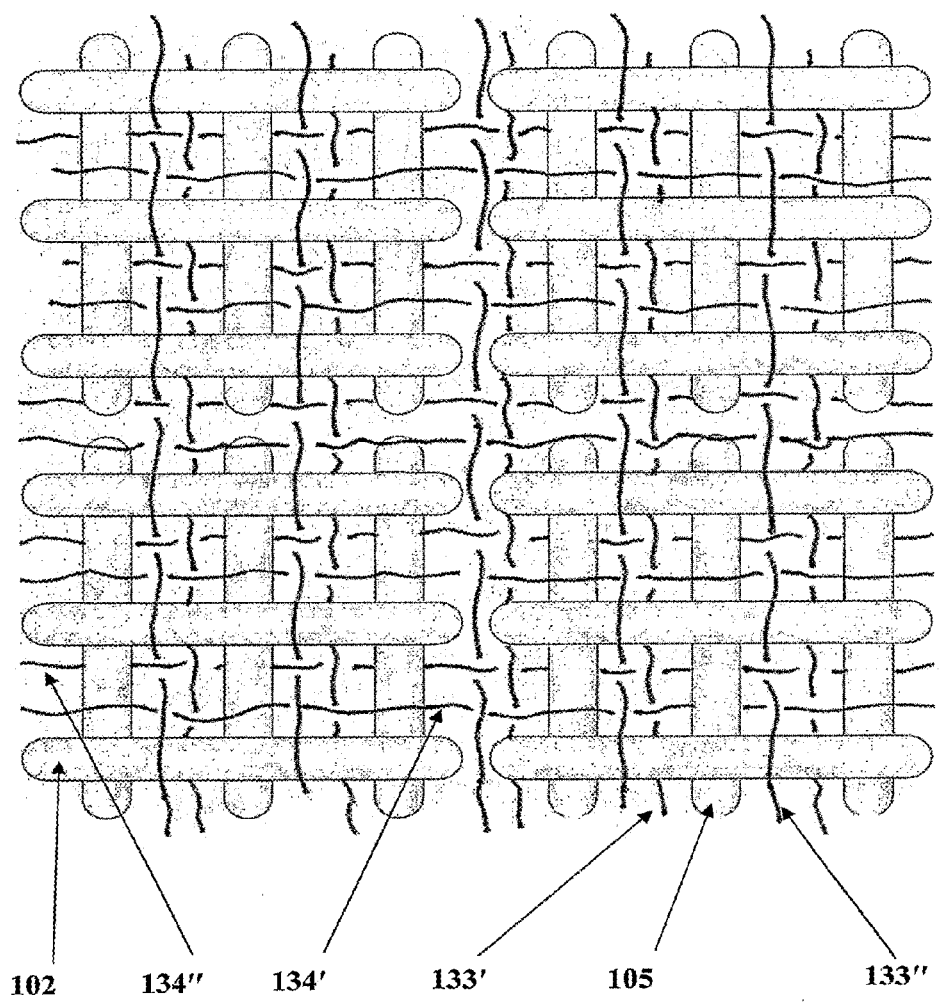
FIG. 10 exemplifies a technique of the present for assembling multiple display modules of FIG. 9 in the tiled display by interleaving all the conductors of all pairs of the sets of conductors of display modules into a fabric with additional dielectric threads.

FIG. 10 exemplifies how multiple display modules (those of FIG. 9 in the present example) can be assembled in the tiled display by interleaving all the conductors of all pairs of the sets of conductors of display modules into a fabric with additional dielectric threads. In this example, four display modules are shown, each is formed by two sets of conductors 105 and 102, which are interweaved together with dielectric threads 133', 134', 133" and 134" into a fabric thus forming the entire tiled display device. The end portions of all the conductors are bent to the back side.

In some embodiments of the invention, front sides of the display modules (by which they are exposed to viewers) are glued (by transparent glue) to a transparent solid or flexible substrate. Also, in some embodiments of the invention, a certain grid (mesh) may be inserted between the display modules and this transparent substrate. The grid pitches are preferably equal to the pixel pitches in corresponding directions. The grid is substantially light blocking, e.g. black. Such a grid may serve as ruler for assembling the display module(s).

Figure 11:
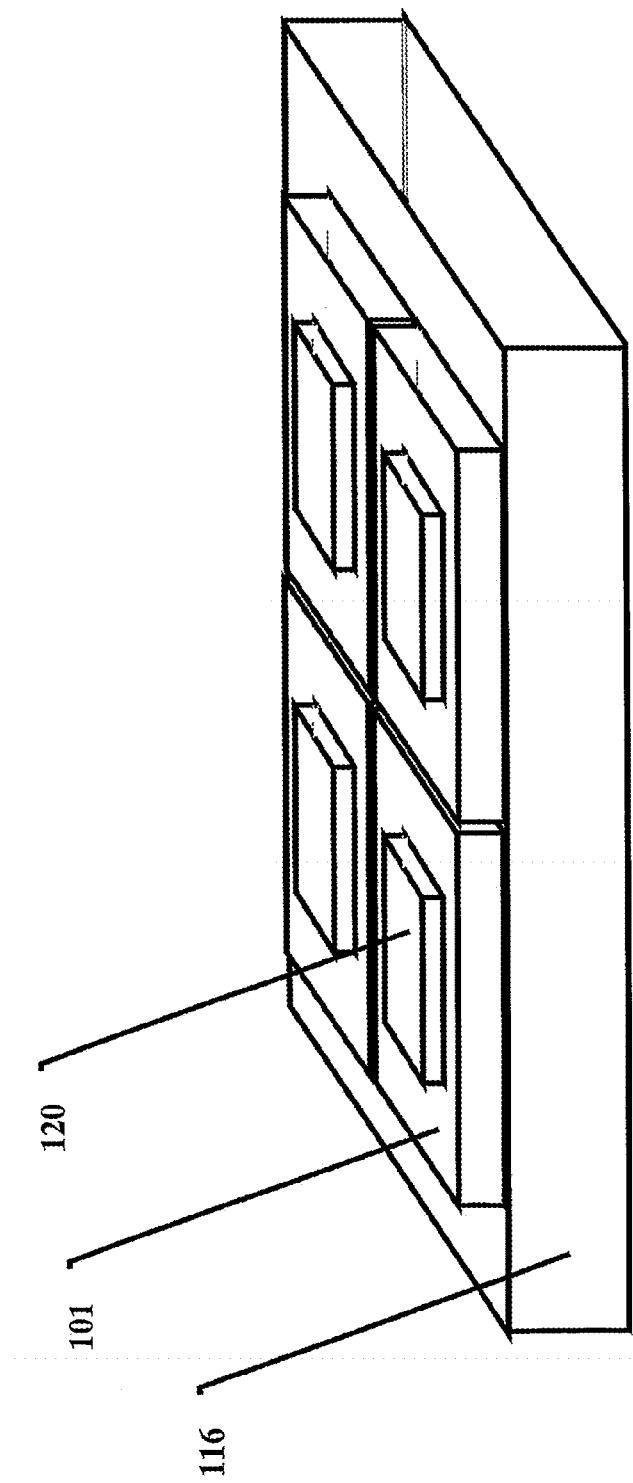
FIG. 11 illustrates a multi-module display device of the present invention where the display modules are glued to a transparent substrate.

FIG. 11 illustrates a multi-module display device in which modules, generally at 101, are glued to a transparent substrate 116 (e.g. glass) by transparent glue. Display module controllers, generally at 120, are located on the back sides of the display modules. For repairs, transparent glue may be used which can be removed (e.g. by heating).

Figure 12:
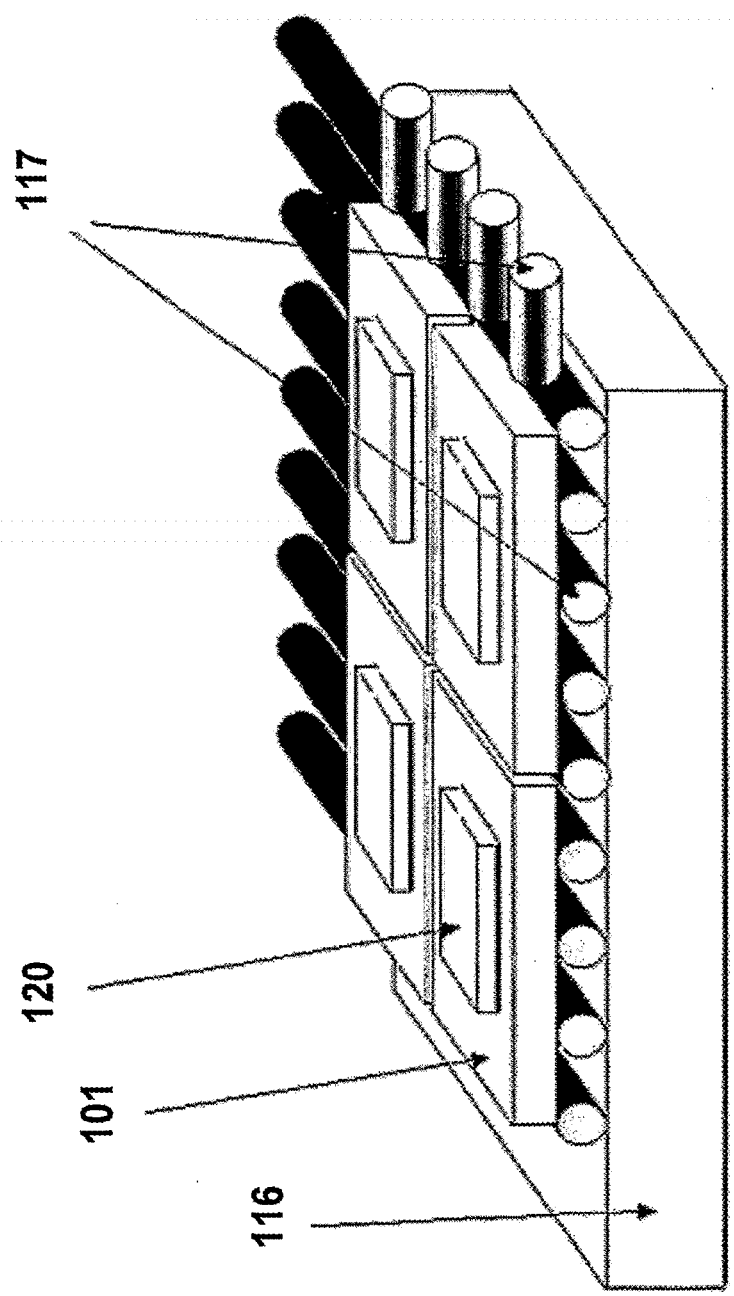
FIG. 12 illustrates yet other example of a multi-module display device of the present invention utilizing a grid between a transparent substrate and the display modules carried by said substrate.

FIG. 12 exemplifies a somewhat similar multi-module display device differing from the above example in that a grid 117 is placed between a transparent substrate 116 (glass) and those sides of display modules 101 by which they face the substrate. The grid 117 is formed by fibers (e.g. black nylon mesh) that mask the boundaries between the modules (subdisplays), and serves as a ruler assisting in keeping an equal distance between the pixels during the tiled display assembling. Being black, the grid increases the contrast of the image.

The display modules have their own controllers, and controlling of information input to the controllers may be effected via any suitable matrix method. The latter is known per se and therefore need not be described in detail, except to note it that consists of selectively addressing the pixels using common row and column electronic blocks. In some other embodiments, the display modules are divided into several groups, and the controlling of information input to the controllers of the display modules of the same group is effected via a matrix method while control of each group is effected by a separate controller.

Figure 13:
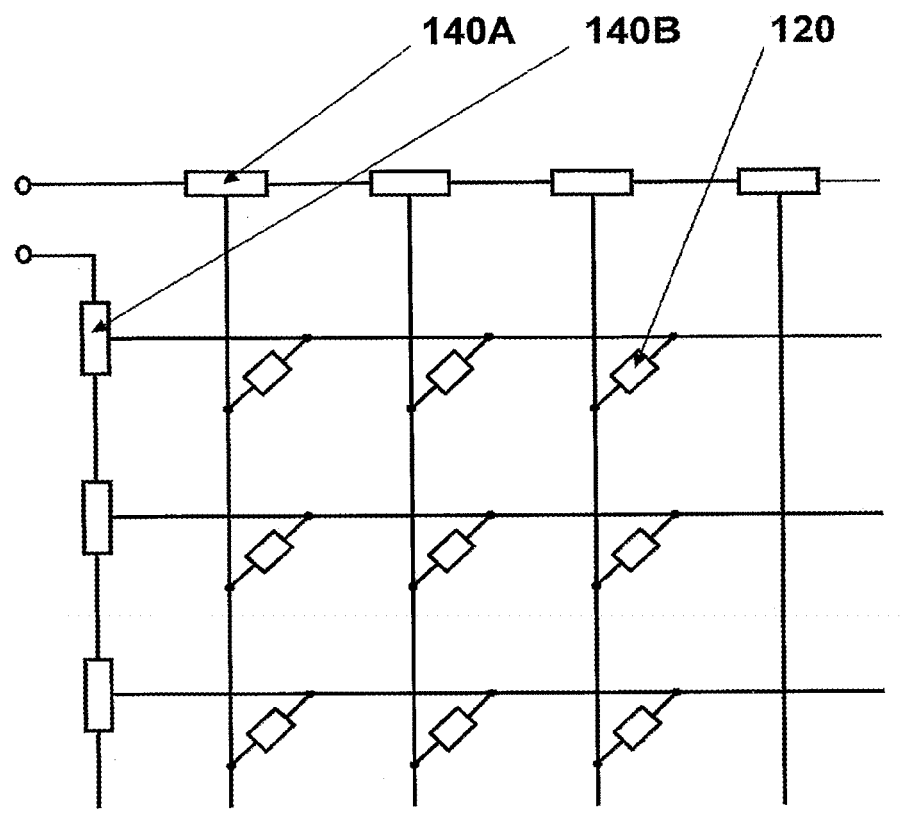
FIG. 13 exemplifies a matrix scheme of display controlling.

FIG. 13 exemplifies a matrix scheme of display controlling. As shown, row and column controllers 140A and 140B are provided, being associated with the subdisplay controllers 120.

Thus, the present invention provides a simple and feasible solution for flat panel display configuration, achieving both the desirably large size of the entire tiled display together with high resolution. The display device of the present invention, in which the conductors of each set are extended to the back side of the display device by bending, can be used as a basic block for configuring a multi-module tiled display device. Preferably, the present invention utilizes electroluminescent material as an active medium. The present invention also provides for configuring a colored display device. Preferably, the display device of the present invention utilizes electrically conductive thin wires or strips thus facilitating their bending to the back side of the device and reducing the spaces between the display modules.

Those skilled in the art will readily appreciate that various modifications and changes can be applied to the embodiments of the invention as hereinbefore described without departing from its scope defined in and by the appended claims.

What is claimed is:

1. A flat panel display device formed by a plurality of display modules wherein each of said display modules comprises a fabric,
   wherein said fabric comprises two sets of electrically conductive fibers extending along two intersecting axes respectively defining a two-dimensional array of junctions,
   wherein said array of junctions and active media located in a vicinity of said junctions forms a matrix of subpixels of different colors forming pixels,
   wherein each of said display modules comprises a front side by which it is to be exposed to viewers and an opposite back side where an electronic control circuit is located,
   wherein each of the fibers of at least one of said two sets is a single piece conductor with at least one end bent and extending from the front side to the opposite back side of the display module, thereby defining corresponding edge of the display module, and
   wherein at least one of said two sets of fibers is formed by a plurality of groups of fibers each containing at least two fibers and the subpixels of different colors of the pixels are formed by junctions of said groups of the fibers.

2. The display device according to claim 1, wherein each of said display modules further comprises a substrate carrying said fabric.

3. The display device according to claim 1, wherein said electrically conductive fibers are woven in the fabric.

4. The display device according to claim 1, wherein a distance between the electrically conductive fibers, a thickness of the electrically conductive fibers, a distance between the extremely located electrically conductive fiber of each set and a close and parallel thereto edge of the front side of the display module, and a distance between said display modules, are selected to provide equally distanced pixels along each of said two axes within the entire flat panel display device.

5. The display device according to claim 1, wherein each electrically conductive fiber is in electrical contact with a contact pad on said back side of the respective display module.

6. The display device according to claim 1, wherein said active media is located on the electrically conductive fibers of at least one said set of electrically conductive fibers.

7. A flat panel display device formed by a plurality of display modules
   wherein each of said display modules comprises a fabric,
   wherein said fabric comprises two sets of electrically conductive fibers extending along two intersecting axes respectively defining a two-dimensional array of junctions,
   wherein active media is located on the electrically conductive fibers of one of said two sets of electrically conductive fibers, and an additional layer of a substantially transparent electrically conductive material is located over said active media in the vicinity of the junctions to thereby ensure an electric contact between the active media and the electrically conductive fibers within said junctions,
   wherein said array of junctions and active media located in a vicinity of said junctions form a matrix of pixels,
   wherein each of said display modules comprises a front side by which it is to be exposed to viewers and an opposite back side where an electronic control circuit is located,
   wherein each of the fibers of at least one of said two sets is a single piece conductor with at least one end bent and extending from the front side to the opposite back side of the display module, thereby defining corresponding edge of the display module, and
   wherein said two sets of fibers are formed by a plurality of groups of fibers containing at least one fiber and the pixels are formed by junctions of the groups of said two sets of fibers.

8. The display device according to claim 7, wherein said active media comprises active media of at least two different types capable of emitting or modulating light of at least two different wavelengths, respectively, the different types of the active media being located at different junctions, respectively forming different subpixels.

9. The display device according to claim 1, wherein the electrically conductive fibers of at least one of said two sets of electrically conductive fibers are configured as flat yarn.

10. The display device according to claim 1, wherein said fabric is formed by dielectric threads woven with the electrically conductive fibers of said two sets of electrically conductive fibers.

11. The display device according to claim 1, wherein said fabric is formed by previously stretched elastic threads woven with the electrically conductive fibers of said two sets of electrically conductive fibers.

12. The display device according to claim 10, wherein the electrically conductive fibers of said two sets of electrically conductive fibers are interlaced with the dielectric threads, while the electrically conductive fibers are arranged in a non-interlacing fashion between them.

13. The display device according to claim 1, wherein said electrically conductive fibers of said plurality of display modules are interwoven with additional dielectric threads into a common for all modules fabric.

14. The display device according to claim 1, wherein the adjacent display modules are bonded or sewed with dielectric thread.

15. The display device according to claim 1, wherein the adjacent display modules are connected with previously stretched elastic threads or bands.

16. A flat panel display device formed by a plurality of display modules,
- wherein each of said display modules comprises a fabric,
- wherein said fabric comprises two sets of electrically conductive fibers extending along two intersecting axes respectively defining a two-dimensional array of junctions,
- wherein said array of junctions and active media located in a vicinity of said junctions form a matrix of pixels,
- wherein each of said display modules comprises a front side by which it is to be exposed to viewers and an opposite back side where an electronic control circuit is located,
- wherein each of the fibers of at least one of said two sets is a single piece conductor with at least one end bent and extending from the front side to the opposite back side of the display module, thereby defining corresponding edge of the display module,
- wherein said two sets of fibers are formed by a plurality of groups of fibers containing at least one fiber and the pixels are formed by junctions of the groups of said two sets of fibers, and,
- wherein the front sides of the display modules are glued by a transparent glue to a common transparent substrate.

17. The display device according to claim 16, wherein the transparent substrate is solid or flexible, or has a combination of solid and flexible regions.

18. The display device according to claim 16, comprising a grid inserted between the display modules and said transparent substrate.

19. The display device according to claim 18, wherein said grid is black.

20. The display device according to claim 1, wherein each of the display modules comprises its own controller circuit, all the display modules being divided into one or more groups each including one or more modules, control of information input to the controller circuits of the display modules of the same group being effected via a matrix technique, and control of each group being effected by a separate controller unit.

21. The display device according to claim 1, wherein said active media comprises at least one electroluminescent or electro-light-modulating material.

22. The display device according to claim 21, wherein said at least one electroluminescent material includes at least one of the following: inorganic phosphors, layers of semiconductor materials forming inorganic LEDs, small molecular or polymer organic luminophore, polymer LED structure.

23. The display device according to claim 16, wherein said active media comprises active media of at least two different types capable of emitting or modulating light of at least two different wavelengths, respectively, the different types of the active media being located at different junctions, respectively forming different subpixels.

* * * * *